Sept. 26, 1933.  C. G. GARRARD  1,928,529
METHOD OF AND APPARATUS FOR CUTTING GROOVES, RECESSES, AND THE LIKE
Filed April 22, 1931  4 Sheets-Sheet 1
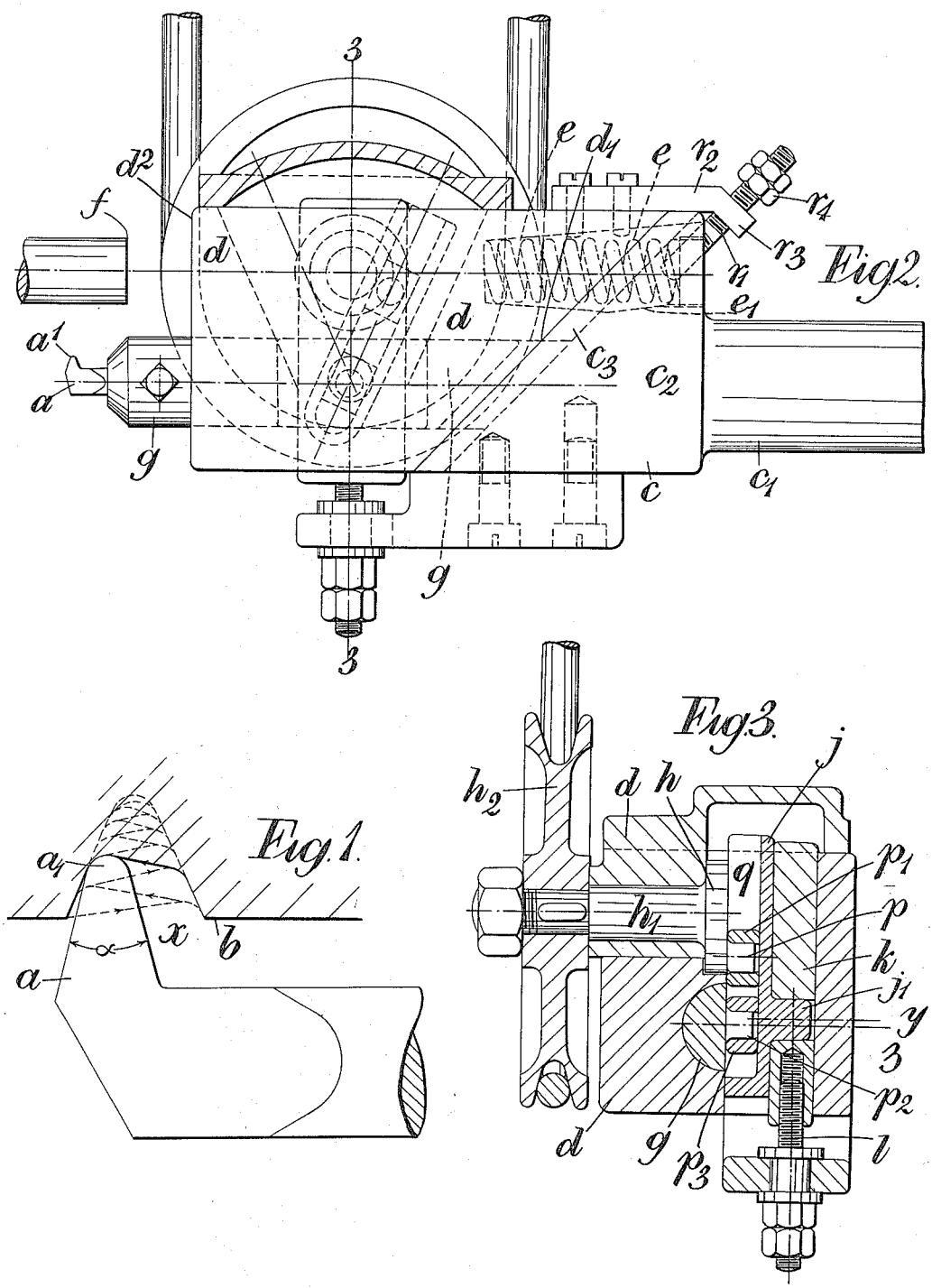

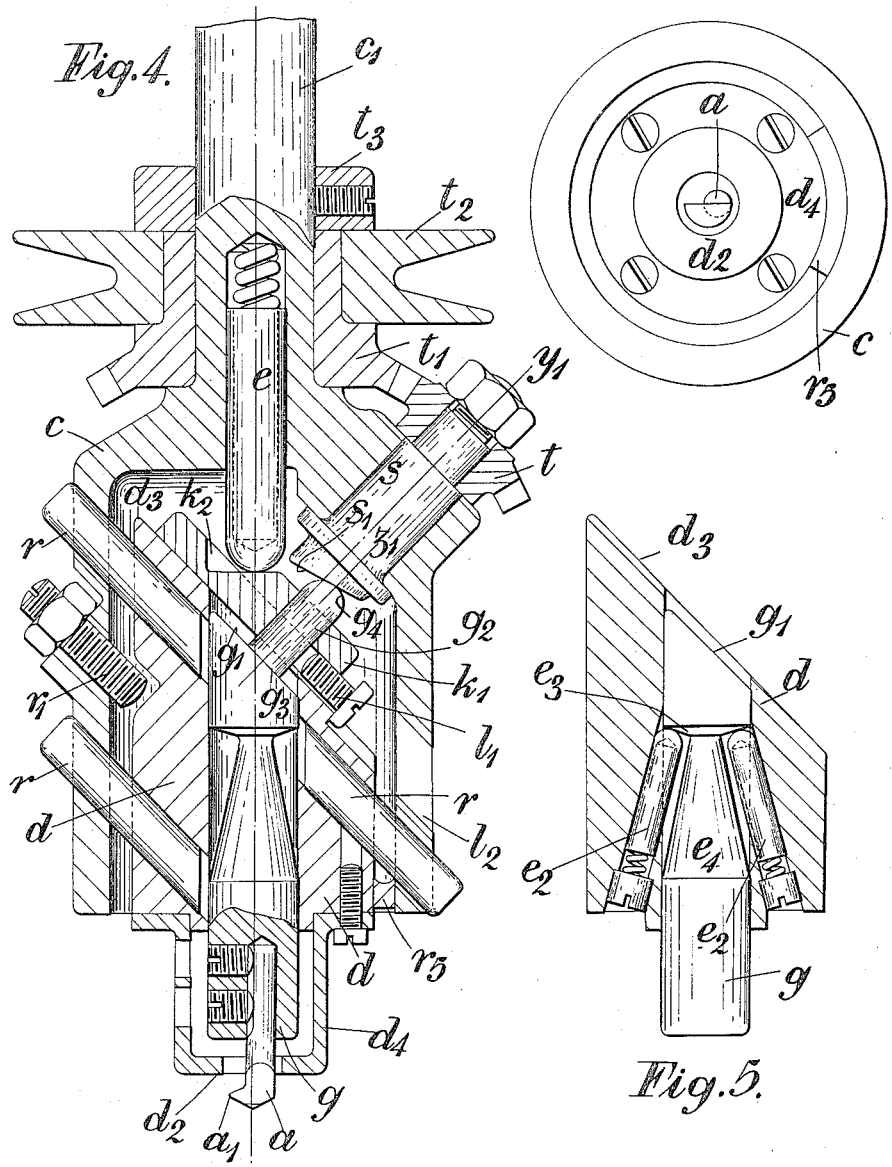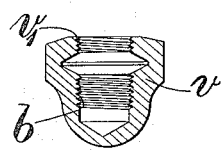

Sept. 26, 1933.  C. G. GARRARD  1,928,529
METHOD OF AND APPARATUS FOR CUTTING GROOVES, RECESSES, AND THE LIKE
Filed April 22, 1931  4 Sheets-Sheet 4
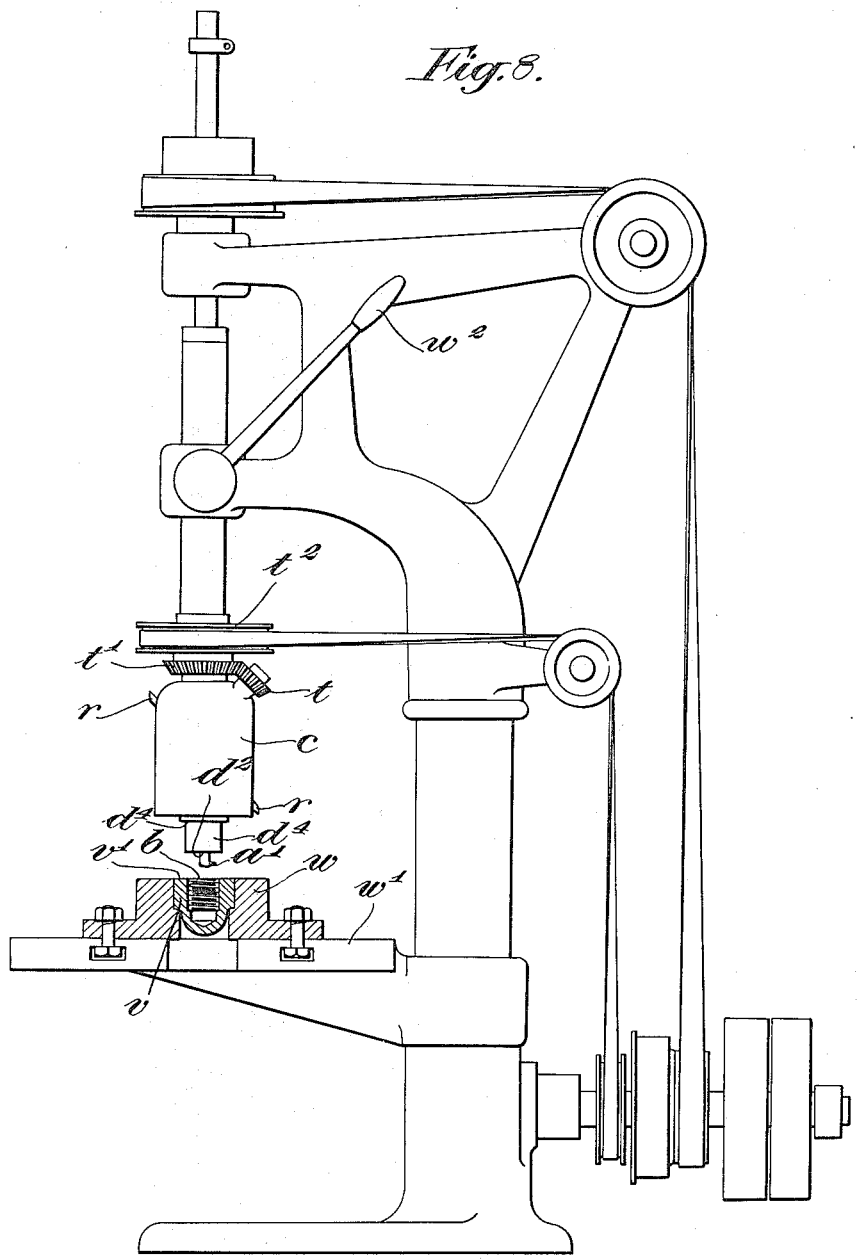

UNITED STATES PATENT OFFICE 1,928,529

METHOD OF AND APPARATUS FOR CUTTING GROOVES, RECESSES, AND THE LIKE

Charles George Garrard, Thorngreen, Thorn, near Dunstable, England, assignor to Evertite Locknuts Limited, London, England Application April 22, 1931, Serial No. 532,094, and in Great Britain May 23, 1930

18 Claims. (Cl. 82—2)

This invention relates to the cutting of grooves or recesses in internal bores, as for instance the cutting of annular grooves in the interiors of nuts or nut blanks to impart self-locking properties to the finished nuts. If a groove of V-section is cut according to the ordinary method by means of a tool of the same shape as the required groove there is necessarily a progressive increase in the length of cutting edge as the tool is fed into the material and this presents a disadvantage especially when blanks of small bore are being dealt with and the tool shank has to be of slender proportions tending to break under the strain of cutting. Another method involving the use of two tools inserted into the bore from opposite ends and feeding the tools in such a way that each cuts one side of the groove enables clearance to be used and the cutting edge length to be reduced and kept constant, but is limited in its application to nuts above about $\frac{5}{16}$" B. S. F. and further cannot be applied to the grooving of blind or capped nuts such for instance as are used in detachable vehicle wheels and otherwise.

The object of the present invention is to provide an improved method of cutting grooves as above while obviating such difficulties as those referred to and to provide improved and simplified apparatus for carrying out said method.

The invention consists in a method of cutting annular grooves or recesses in an internal bore while maintaining the length of cutting edge small and substantially constant, according to which a single more or less pointed tool with side clearance while being fed into the material is subjected to rapid translatory vibrating motion within the required confines of the groove.

The invention further consists in a method according to the preceding paragraph applied to the cutting of grooves of V-section or other narrowing section by progressively reducing the amplitude of vibraton of the cutting region as same is fed into the material.

The invention further consists in a method according to the preceding paragraph wherein the amplitude of vibration is reduced to zero concurrently with the cutting edge reaching the required final depth.

The invention further consists in apparatus for supporting a tool and imparting thereto motions as set forth above comprising two connected members one of which is obliquely slidable in relation to the other, a plunger or like member supported by and axially reciprocatable in relation to said slidable member and carrying the tool, and means for reciprocating or vibrating said plunger.

The invention further consists in apparatus according to the preceding paragraph with means for varying the amplitude of vibration of the plunger or the like for instance in accordance with the extent of displacement between said connected members.

The invention further consists in apparatus according to either of the two preceding paragraphs with means for reducing the amplitude of vibration of the plunger or the like to zero at a determined relative position of the two connected members.

The invention further consists in apparatus according to any of the three preceding paragraphs wherein the vibratory motion of the plunger or the like is obtained from a crank or the like through the intermediary of a pivoted lever rocked thereby and operative at or to one side of its pivot upon said plunger.

The invention further consists in apparatus according to the preceding paragraph wherein the amplitude of tool vibration is varied by alteration of the displacement between the rocking lever pivot and the point of application of moving force to the plunger member, said amplitude being reducible to zero by bringing said pivot and said point into axial alignment.

The invention also consists in apparatus according to any of the three paragraphs next preceding but two wherein the vibratory motion of the plunger member is obtained by the action of swash-plate mechanism e. g. through the intermediary of a member axially movable at an inclination to the axis of said plunger by engagement with an inclined end surface of a suitably driven rotary member.

The invention further consists in apparatus according to the preceding paragraph wherein the amplitude of tool vibration is varied by alteration of the displacement between the axis of said intermediate member and the axis of said rotary member and may be reduced to zero or substantially to zero by reduction of said displacement.

The invention further consists in apparatus according to any of the four preceding paragraphs wherein means are provided for adjustment of the position of said rocking lever pivot in relation to the plunger axis or the position of the axis of said intermediate member in relation to the axis of said rotary member for any given relative position of said connected members.

The invention further consists in apparatus according to the preceding paragraph according to which the axes of the crank shaft and the tool carrying plunger referred to are fixed in relation to one another and to the sliding member, the pivot for the rocking lever being adjustably fixed in relation to the other member.

The invention further consists in apparatus according to the paragraph next but one preceding wherein the axis of the rotary member of the swash-plate mechanism referred to is fixed in relation to one of said connected members and the axis of the intermediate plunger is adjustably fixed in relation to the slidable member.

The invention further consists in the improved methods of cutting grooves and recesses substantially as hereinafter described.

The invention further consists in apparatus suitable for carrying out the foregoing method, and forms of such apparatus substantially as hereinafter described.

Referring to the accompanying drawings:—

Figure 1 is a diagrammatic view to an enlarged scale illustrating an application of the method of this invention to the cutting of V-section grooves;

Figure 2 is a part-sectional side elevation of one form of apparatus according to the invention and suitable for execution of the said method;

Figure 3 is a cross sectional elevation on the line 3—3 of Figure 2;

Figure 4 is a sectional elevation of an alternative form of apparatus of which

Figure 5 is a sectional elevation of a certain internal part taken in a different plane and Figure 6 is an inverted plan.

Figure 8 is a side elevation of a machine incorporating apparatus constructed and operating as shown in detail in Figures 1 and 4 to 6 inclusive.

Figure 7:
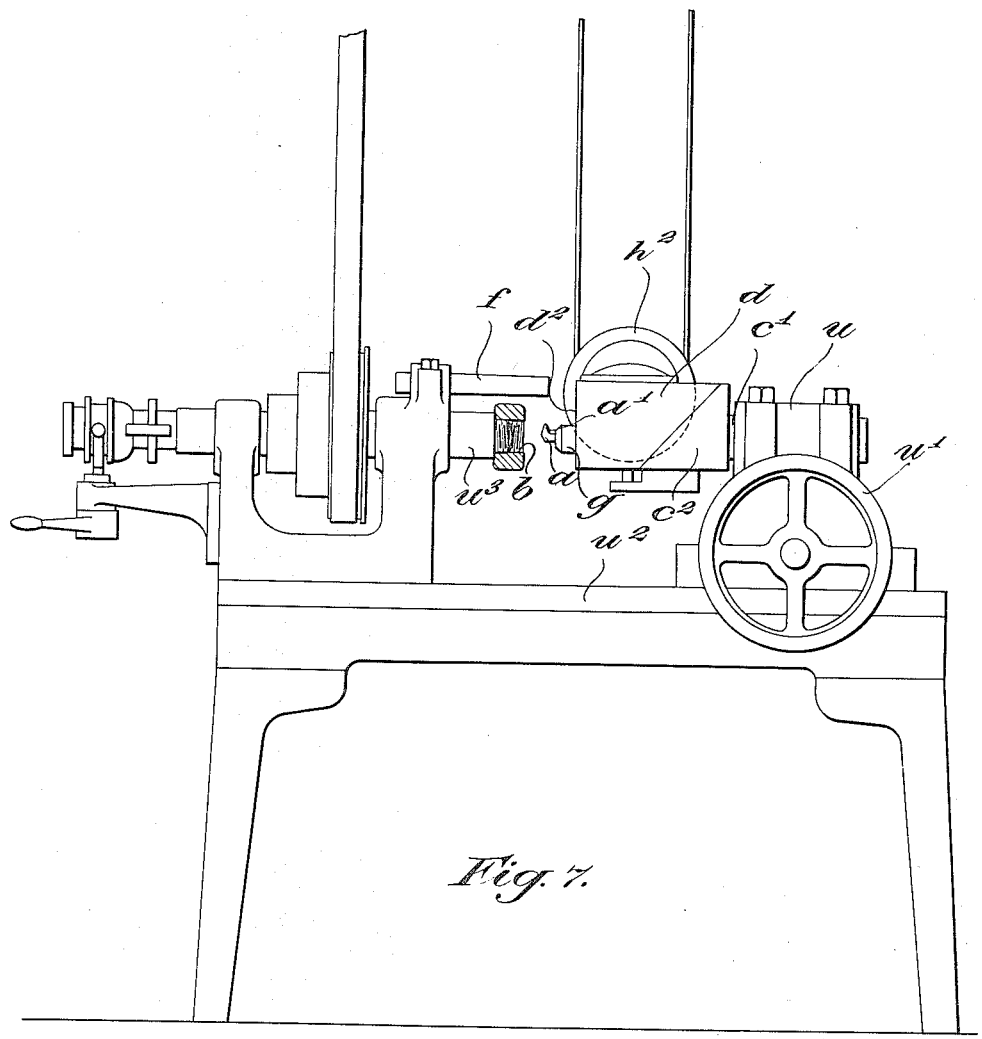
Figure 7 is a side elevation of a machine incorporating apparatus constructed and operating as shown in detail in Figures 1 to 3 inclusive.

In carrying the invention into effect in one form as applied to the cutting of an internal annular groove in nuts or nut or other bored blanks the work is supported for rotation in a chuck or other convenient device and a cutting tool of pointed form conveniently supported is inserted into the bore to the requisite distance, whereupon as the work is rotated the tool is fed radially outwards into engagement with the bore. Referring to Figure 1 wherein the bore of the work is indicated at $b$, as the tool $a$ is so fed it is subjected also to a comparatively rapid vibratory motion in the direction of the axis of the work with an amplitude depending upon the width of the groove to be cut and the relation thereto of the width and shape of the tool. By the above means the length of cutting edge presented to the work is kept small and constant irrespective of the depth of penetration of the tool into the material and ample side clearance can be provided. In Figure 1 a groove of V-section is shown in the process of being cut in the above way, the nose $a_1$ of the tool following a path such as is indicated by the dotted line $x$.

For cutting V-section grooves a tool is used having as in Figure 1 a point radius equal to the radius required at the bottom of the completed groove but its angle $\alpha$ is less than the angle between the opposite sides of the groove. Thus, if the latter angle is 45° the tool angle $\alpha$ may be say about 30°. When cutting a V-groove as above the amplitude of the reciprocation of the tool is to be progressively reduced so that as in Figure 1 the cutting edge in effect is to move into the material in a zig-zag fashion within the confines of an imaginary triangle to which the groove is to conform, said motion ceasing at the requisite depth and the final cut being to complete the radius at the bottom of the groove.

Various forms of apparatus may be devised for carrying out the foregoing method and one such apparatus in the form of a tool carrier or fixture such as may be supported in the head of a machine, such as is shown in Figure 7 and may be adapted also for such other operations as tapping of the nut, is shown in detail in Figures 2 and 3. The device comprises a member $c$ having a shank $c_1$ terminating at one end in a more or less square section block $c_2$ having an end surface $c_3$ inclined say at 45° to the shank axis which angle may be subject to alteration in some cases.

Co-operating with said shanked member $c$ and provided with an inclined surface $d_1$ complementary to and adapted for sliding under suitable guidance upon the inclined surface $c_3$ of the former is another member $d$ of more or less hollow construction and preferably as shown in a number of parts suitably fixed together which member $d$ carries the tool on an axis lying parallel to and normally coincident or approximately coincident with the axis of the shank $c_1$. The form of connection between said two members $c$ and $d$ is such that if one be forced axially towards the other the axes of the tool $a$ and the shank $c_1$ respectively will be laterally displaced to a greater or lesser extent. Spring means $e$ housed say in recesses $c_1$ in the two relatively sliding members $c$ and $d$ are provided and arranged to return said members to their coaxial or other original relative position when the displacing force is removed.

The sidewise motion as above is utilized for feeding the cutting edge of the tool into the material of the blank to be recessed, the construction described being suitably supported in a laterally movable saddle or tool rest $u$ by the shank $c_1$ and arranged so that it can be moved bodily by rotation of the handwheel $u_1$ along the bed $u_2$ towards the work to insert the tool into desired cutting position. Stop means $f$ are provided and so located in fixed relation to the work as when the tool has been inserted into required cutting position to become engaged by the end $d_2$ of the sliding member and to arrest further axial motion thereof. The work being suitably rotated on the spindle $u_3$ of the machine, continued axial movement of the saddle and its supported shanked member $c_2$ towards the work will cause the cutting edge $a$ to be moved radially and applied to the bore and forced into the material for the cutting operation. For limiting the depth to which the tool can so be inserted a stud $r_1$ is provided in the part $c_2$ on an axis parallel to the sliding surfaces $c_3$ $d_1$. A plate $r_2$ is secured to the top surface of the member $d$ and an overhanging portion $r_2$ is provided with a hole through which the stud $r_1$ passes. Nuts $r_4$ are set to provide the necessary stop in the direction of the bore while engagement of the plate $r_3$ with the top surface of the part $c_2$ provides the other stop i. e. for setting the axes of the plunger $g$ which carries the tool $a$ and of the shank $c_1$ in coaxial or other suitable neutral position.

For imparting the requisite rapid axial vibration to the cutting edge as above indicated while feeding the tool radially outwards the tool is adapted to execute such movement relatively to the sliding member $d$ described above.

Thus, in the form shown the tool is carried conveniently in the end of a plunger $g$ adapted only for reciprocative movement within a suitable complementary guiding recess in the sliding member $d$ and the reciprocation is effected by means of a crank $h$ supported upon a shaft $h_1$ disposed in journal means in said same member $d$ with its axis some fixed distance away from and at right angles to the plunger axis. The crankshaft is conveniently driven by a pulley $h_2$ located externally.

The pin $p$ of the crank $h$ which is housed within the hollow interior of the sliding member $d$ is provided with a friction block $p_1$ which is a sliding fit within a groove $q$ formed in the side of a lever $j$ which is also located inside said member and is pivoted at $j_1$ on an axis parallel to the crankshaft axis and a suitable distance clear of the path of the crank pin $p$. Rotation of the crank $h$ causes the lever $j$ to oscillate about its pivot $j_1$ and from the lever $j$ the tool-carrying plunger $g$ takes up a reciprocating motion through a pin $p_2$ also provided with a friction block $p_3$ engaging slidably in said groove $q$ in the lever.

The region of engagement of the plunger pin block $p_3$ with the lever $j$ is generally, as shown, located to the opposite side of the rocking centre $y$ of the lever and may usually be located considerably nearer to the lever pivot than is the axis of the crankshaft $h_1$ so that the stroke of the tool is considerably less than the diameter of the crank pin path.

The frequency of reciprocation of the tool obtained as above is variable with the speed of rotation of the crank $h$ and its amplitude depends upon the distance between parallel planes containing respectively the axis of the plunger $g$, the axis of the crankshaft $h_1$ and the axis $y$ of the rocking lever pivot at $j_1$. In the above construction the distance between the first two of these axes is fixed and the amplitude of tool movement can be varied by displacing these axes together in relation to the axis $y$ of the rocking lever pivot and further the parts are so arranged and set that the axes $z$ and $y$ of the plunger pin $p_2$ and the lever pivot $j_1$ respectively can be brought into coincidence in which condition the plunger will cease to reciprocate although the lever continues to oscillate.

The construction described above is primarily intended for the cutting of V-section grooves and the amplitude of vibration of the tool is therefore required to become lessened progressively, reaching zero when the tool is at the bottom of the groove, and this is arranged to take place automatically with the above described sidewise displacement of the sliding member $d$ for feeding the tool radially. The rocking lever pivot $j_1$ is provided on a block, slide or the like $k$ adjustably fixed in relation to the shanked member $c$ of the holder so that as the tool is displaced sidewise as above the lever pivot $j_1$ remains stationary and the plunger pin $p_2$ approaches along the rocking lever groove $q$ nearer to said pivot and ultimately into such position that the axes $y$ and $z$ are in coincidence.

The block $k$ referred to is adapted for adjustment by screw $l$ or other means in relation to the shanked member $c$ along a line at right angles to the axis of the tool-carrying plunger in such a way as enables coincidence of the rocking lever pivot $j_1$ and the plunger pin $p_2$ with elimination of tool vibration to be obtained with the sliding member $d$ in any desired position in relation to the shanked member, that is, with the tool at any desired depth in the material of the work.

In the foregoing description reference is made to the work actually being rotated while the tool is not but it is to be understood that the opposite conditions may be arranged for as for instance when cutting grooves in bores in bodies of a relatively large size and/or such as cannot conveniently be rotated. In this connection a construction generally alike to that described above may be supported in such a way that it can be rotated as a whole, the crank drive being suitably modified.

One suitable modified construction of such a device wherein the tool and allied parts are rotated is illustrated in Figures 4, 5, 6 and 8. In these figures $c_1$ is a shank suitable for holding say in the drilling machine spindle shown in Figure 8 while the members marked $c$ and $d$ respectively correspond in their functions with the parts similarly lettered in Figures 2 and 3.

In the present case the member $c$ is of hollow open-ended construction and the obliquely sliding member $d$ which carries the tool $a$ is contained largely within $c$, the inclined pins $r$ driven inwardly through opposite walls of the member $c$ into corresponding holes in the member $d$ providing inclined guides corresponding to the surfaces $d_1$, $c_3$ of the former device. An adjustable stop, as the screw $r_1$, is provided for limiting the sidewise movement of the member $d$ and its carried tool $a$ in one direction in relation to the member $c$ while a spring loaded plunger $e$ guided in and coaxial with the shank $c_1$ is employed, as more accurately described hereinafter, for resiliently retaining the member $d$ in neutral or coaxial position against a stop $r_5$ provided by a localized inwardly directed shoulder at the mouth of the member $c$.

As in the previous arrangement the tool is carried in the end of a plunger $g$ reciprocatable but prevented from rotating within a suitable guiding recess or hole in the sliding element $d$ but the means for reciprocating the plunger are necessarily altered to accommodate bodily rotation of the described construction and it is convenient to utilize swash-plate mechanism.

The plunger $g$ terminates in a surface $g_1$ lying in a plane parallel to the pins $r$ and a suitable distance short of the end face $d_2$ of the member $d$ which also lies parallel with said pins. Adapted for movement across the surface $d_3$ under suitable guidance is a slide member $k_1$ through which is slidably passed a small plunger $g_2$ having its axis $z_1$ normal to said surfaces $g_1$ and $d_3$. One end surface $g_3$ of the plunger $g_2$ is adapted slidably to engage the surface $g_1$ while its opposite end $g_4$ is rounded as shown. The reciprocating motion required is imparted to the plunger $g$ in one direction positively through the small plunger $g_1$ and in the return direction by means of spring-loaded plungers $e_2$ entered obliquely into the end of the member $d$ (as shown in Figure 5) and adapted to bear against an annular shoulder $e_3$ conveniently formed in the plunger by reducing the diameter thereof in a taper at $e_4$.

Referring again to Figure 4 the plunger $e$ previously mentioned thrusts upon the member $d$ through the slide $k_1$ against a flat surface $k_2$ of which it bears. The rounded end $g_4$ of the plunger $g_1$ engages a suitably inclined end surface $s_1$ of a spindle $s$ journalled in the member $c$ on an axis $y_1$ disposed parallel to the axis $z_1$ referred to, which spindle is driven through a train of bevel gear wheels $t$, $t_1$ the latter of which is journalled upon the shank $c_1$, being secured against axial motion by means of a collar $t_3$ and driven by means of a pulley $t_2$. The pulley being driven round in relation to the shank $c_1$ and attached parts including the tool, the spindle $s$ will be rotated in its journal and through the positive action of the small plunger $g_2$ and the resilient return action of the plungers $e_2$ the main plunger and tool will oscillate with an amplitude depending upon the displacement of the axis $z_1$ and $y_1$ as well as upon the inclination of the end surface $s_1$ of the spindle $s$ in relation to its axis $y_1$. Preparatory to setting the device in operation, the slide $k_1$ is adjusted in relation to the member $d$ by means for instance of a screw $h$ accessible through an opening $l_2$ in such a way that, with the member $d$ pressed downwards by the plunger $e$ as far as the stop $r_5$ will allow, the axis $z_1$ of the plunger $g_2$ is displaced from the axis $y_1$ of the plunger $s$ by a distance suitably related to the distance through which it is required that the axis of the plunger $g$ be moved in relation to the axis of the drilling machine spindle in feeding the tool into the material of the work to the required depth. This setting having been effected a suitable drive is applied usually by belt through the gears $t$, $t_1$ to the spindle $s$ and the drilling machine spindle set in rotation whereupon the latter is fed axially to enter the tool into the bore to be operated upon. The bore may for instance be the bore $b$ in a blind nut $v$ held say in a suitable jig $w$ set in the position indicated in Figures 4 and 8, that is, on the table $w$, and coaxial with the drilling machine spindle, the point $a_1$ of the tool being entered just clear of the bore. In such a case the end $d_2$ of a suitable hollow extension piece $d_4$ of suitable length fixed by set screws to the end of the member $d$ is brought into abutment with the end face $v_1$ of the nut whereafter, as the machine spindle is forced downwards by the handle $w_2$, movement of the member $d$ is confined by the pins $r$ to outward radial movement with respect to the nut and the tool is forced into the material thereof with its original amplitude of oscillation being progressively diminished as the axis $y_1$ is moved downwardly with the member $c$ towards coincidence with the axis $z_1$.

It is understood that in any design of apparatus on the lines of either of the two forms above described the angle along which the tool supporting member is moved in relation to the machine spindle is related definitely to the means for vibrating the tool and these having been fixed the shape of annular recess which can be cut is also fixed.

It is to be understood that the forms of apparatus described above are given by way of example only and other embodiments of the invention are possible. The methods and apparatus may well, with modifications mainly say in connection with the relative positions of or means for supporting the swinging lever pivot, the crankshaft centre and the tool plunger axis in the first form of apparatus particularly described above and the corresponding elements in the alternative device, be applied in some instances to the cutting of square section grooves or grooves whereof the sides diverge with depth and although in the case of square grooves the ordinary method employing a more or less flat cutting edge substantially as wide as the required groove and feeding thereof without vibration into the material may permit of clearance and may not involve variation in cutting edge length, it does involve a length of edge long in comparison with that of a tool used in accordance with the invention, which latter further scores in any of its applications over known methods in the matter of avoiding fouling of the cutting edge by shavings or cuttings where space is limited. Also it may be added that either form of apparatus described above may be included in a complete machine specially designed for the purpose and if desired for the execution of other operations upon the work in which the article to be used and/or the tool may be rotated as required.

Having now described my invention, what I claim as new and desire to secure by Letters Patent is:—

1. For incorporation in a machine tool a device comprising in combination as a unit tool-carrying means reciprocable along an axis, means for vibrating the same along said axis, and means for moving said tool-carrying means transversely in relation to said axis, said vibrating means and said transverse movement means being operatable simultaneously.

2. For incorporation in a machine tool a device comprising in combination as a unit tool-carrying means reciprocable along an axis, means for vibrating the same along said axis at a desired frequency, and means for moving said tool-carrying means transversely in relation to said axis, said vibrating means and said transverse movement means being operatable simultaneously and means co-operating with said vibrating means operating independently of the frequency of said vibration for varying the amplitude thereof.

3. For incorporation in a machine tool a device comprising in combination as a unit tool-carrying means reciprocable along an axis, means for vibrating the same along said axis, and means for moving said tool-carrying means transversely in relation to said axis, said vibrating means and said transverse movement means being operatable simultaneously and means co-operating both with said transverse movement means and with said vibrating means for varying the amplitude of vibration of the tool-carrying means.

4. In a machine tool the combination with tool-carrying means, of means for vibrating the same along an axis, and means for moving said tool-carrying means transversely in relation to said axis, said vibrating means and said transverse movement means being operatable simultaneously, and means co-operating both with said vibrating means and with said transverse movement means and governed by the extent of operation of the latter means for varying the amplitude of vibration of the tool-carrying means between a maximum and zero.

5. In a machine tool the combination with tool-carrying means, of means for vibrating the same along an axis, and means for moving said tool-carrying means transversely in relation to said axis, said vibrating means and said transverse movement means being operatable simultaneously, means for driving said vibrating means, means for rotating said several aforementioned means as a whole, said driving means being unaffected by the joint operation of said transverse movement means and said rotating means.

6. In a machine tool the combination with tool-carrying means, of means for vibrating the same along an axis, and means for moving said tool-carrying means transversely in relation to said axis, said vibrating means and said transverse movement means being operatable simultaneously, means for driving said vibrating means, means for rotating said several aforementioned means as a whole upon an axis parallel to the first axis, said driving means comprising gear including an element in operative connection with said vibrating means and another element rotatable upon said parallel axis independently of said rotating means and in operative connection with said first element.

7. Apparatus for cutting annular grooves in internal bores comprising a tool having a pointed cutting portion accommodatable with side clearance within the confines of the groove to be produced, means carrying said tool, two relatively displaceable connected members in relation to one of which said tool-carrying means is supported for oscillation along an axis, said two connected members having guide means constraining their relative displacement to a direction transverse of said axis, elements connected to said members and co-operative to generate oscillatory movement and impart it to said tool-carrying means with such amplitude as is required for the tool to cut to the desired width, means for presenting the combination to insert the tool axially of the work into desired operating relation to the bore thereof, and means for displacing said connected members.

8. Apparatus for cutting annular grooves in internal bores comprising a tool having a pointed cutting portion accommodatable with side clearance within the confines of the groove to be produced, means carrying said tool, means for relatively rotating the work and the tool, two relatively displaceable connected members in one of which said tool-carrying means is supported for oscillation along an axis, guide means constraining the relative displacement of said two members to a direction transverse of said axis and resilient means for restoring them to an original relative position, elements movably connected to said members and co-operative to generate oscillatory movement and impart it to said tool-carrying means with such amplitude as is required for the tool to cut to the desired width, means for advancing the combination to insert the tool axially into the bore of the work in position for commencing to cut, said one of the two connected members in which the tool-carrying member is oscillatable having a region meeting a stop fixed in relation to the work when the combination has been disposed in said position which stop prevents further axial movement of said one member and, when the other of said two connected members is further advanced, co-operates with said guide means to displace said one member laterally against the action of said resilient means with the tool and its carrying means to provide a cutting feed.

9. Apparatus according to claim 7, wherein said oscillation-generating elements comprise a rotary driving element journalled in one of said two connected members, an element situated intermediately of said rotary element and said tool-carrying means and co-operating both with a region of greater or less eccentricity of said rotary element and with the said tool-carrying means to receive a periodic displacement from the former and transmit such displacement to the latter, said intermediate element having an axis of movement displaceable in relation to one of the two axes respectively of said rotary element and of said tool-carrying means by the said relative displacement of said two connected members.

10. Apparatus according to claim 8 wherein said oscillation-generating elements comprise an externally driven rotary element journalled in one of said two connected members, an oscillatable intermediate element engaging a region of greater or less eccentricity of said rotary element whereby to receive therefrom periodic oscillative displacements upon an axis, said intermediate element engaging also with said tool-carrying means to transmit its said displacements to the latter, the three axes respectively of the rotary element, of the intermediate element and of the tool-carrying means including two axes which are fixable in relation respectively to the said two connected members, while the third axis and one of the two axes are relatively moved between positions of maximal separation and coincidence with the said displacement of said two connected members.

11. Apparatus according to claim 7 wherein said oscillation-generating elements comprise a crank journalled in one of said two connected members and having a pin operative upon a lever pivotally connected also to one of said two members to impart to such lever an angular oscillative movement, means connecting said lever to said tool-carrying means whereby the latter is oscillated on its axis, said pivotal connection of said lever and the region of connection of the tool-carrying means thereto being relatively movable for affording variation of the amplitude of oscillation imparted to the tool-carrying means.

12. Apparatus according to claim 8 wherein said oscillation-generating elements comprise a crank journalled in the member in which the tool-carrying means is oscillatable, a lever pivotally connected to the other member, a pin on said crank engaging said lever and imparting angular oscillation thereto, a connection fixed in relation to the axis of oscillation of said tool-carrying means between the latter and said lever, said connection being movable in either sense along the lever between regions respectively of maximal displacement and of zero displacement at coaxiality with the lever pivot by the transverse displacement of said two connected members and means for adjusting the position of said lever pivot independently of displacement of said two connected members.

13. Apparatus according to claim 7 wherein said oscillation-generating elements comprise a rotary element journalled in one of said two connected members and having a swash-plate surface, an intermediate element linearly oscillatable in relation to the other of said two connected members which intermediate element contacts both with said swash-plate surface and with said tool-carrying means to transmit an oscillative movement derived from rotation of the said surface to the said tool-carrying means, the axes respectively of said intermediate element and said swash-plate surface being relatively movable for affording variation of the amplitude of oscillation applied to the tool-carrying means.

14. Apparatus according to claim 8 wherein said oscillation-generating elements comprise a rotary element having a swash-plate surface and journalled in the connected member other than that of the two in which the tool-carrying means is oscillatable, an intermediate element linearly oscillatable in means fixable in relation to the latter member which intermediate element contacts at one end with a region of said swash-plate surface and at the other end with a surface of said tool-carrying means to transmit unidirectional pulsative movement derived from rotation of said surface to the said tool-carrying means, such region being movable between positions respectively of maximal displacement and of zero displacement in the centre of said swash-plate surface by the transverse displacement of said two connected members, resilient means operating against said tool-carrying means to provide return pulsations thereof and complete the vibrations and means for adjusting the position of said intermediate element independently of displacement of said connected members.

15. In a machine tool with means for supporting a bored object to be internally grooved, apparatus comprising a pair of members and means for moving the same jointly upon an axis parallel to the axis of the groove to be cut, said members being coupled through surfaces inclined to said axes, abutment means adapted to limit in one direction the said movement of one of said members and thereby to co-operate with the said inclined surfaces laterally to displace the first member when the second member is advanced towards said abutment means, a tool holder supported by said first member for reciprocation relative thereto on an axis parallel to the aforementioned axes, means for vibrating the said tool holder and means for producing relative rotation of the latter and said object about the first-mentioned axis.

16. A method of cutting an annular groove in the bore of a workbody, which consist in applying the cutting edge of a pointed tool to the region of the bore required to be grooved, producing relative rotation between said tool and the work body about the axis of the bore thereof, radially feeding said cutting edge into the material of the workbody while simultaneously reciprocating the tool with determined amplitude in the general direction of said axis.

17. In the method claimed in claim 16, varying the said amplitude of vibration of said tool while effecting said radial feeding thereof into the material.

18. In the method claimed in claim 16, reducing the said amplitude of vibration of said tool from the first application of the said cutting edge to the said bore to a minimum when the desired depth of groove is attained.

CHARLES GEORGE GARRARD.